United States Patent
Ng et al.

(10) Patent No.: US 9,164,674 B2
(45) Date of Patent: Oct. 20, 2015

(54) THREE-DIMENSIONAL GESTURE RECOGNITION SYSTEM, CIRCUIT, AND METHOD FOR A TOUCH SCREEN

(71) Applicants: STMICROELECTRONICS ASIA PACIFIC PTE LTD., Singapore (SG); STMICROELECTRONICS PTE LTD., Singapore (SG)

(72) Inventors: Chee Yu Ng, Singapore (SG); Jo Wang, Taipei (TW); Ravi Bhatia, Singapore (SG)

(73) Assignees: STMicroelectronics Asia Pacific Pte Ltd, Singapore (SG); STMicroelectronics Ltd, Kowloon (HK)

( * ) Notice: Subject to any disclaimer, the term of this patent is extended or adjusted under 35 U.S.C. 154(b) by 315 days.

(21) Appl. No.: 13/852,478

(22) Filed: Mar. 28, 2013

(65) Prior Publication Data
US 2014/0295931 A1    Oct. 2, 2014

(51) Int. Cl.
| G06F 3/041 | (2006.01) |
| G06F 3/0488 | (2013.01) |
| G06F 3/044 | (2006.01) |
| A63F 13/20 | (2014.01) |
| A63F 13/42 | (2014.01) |
| A63F 13/2145 | (2014.01) |

(52) U.S. Cl.
CPC .............. *G06F 3/0488* (2013.01); *A63F 13/20* (2013.01); *A63F 13/2145* (2013.01); *A63F 13/42* (2013.01); *G06F 3/044* (2013.01)

(58) Field of Classification Search
CPC ... G06F 3/04865; G06F 3/0487; G06F 3/044; G06F 3/04875; G06F 3/045
USPC .................... 345/173–179; 178/18.01–18.04
See application file for complete search history.

(56) References Cited

U.S. PATENT DOCUMENTS

| 7,479,949 | B2 |  | 1/2009 | Jobs et al. | |
| 8,312,372 | B2 |  | 11/2012 | Chen et al. | |
| 8,325,134 | B2 |  | 12/2012 | Hill et al. | |
| 8,339,374 | B2 | * | 12/2012 | Chang et al. .................. | 345/173 |
| 2010/0071965 | A1 | * | 3/2010 | Hu et al. ...................... | 178/18.06 |
| 2011/0102339 | A1 | * | 5/2011 | Lin et al. ....................... | 345/173 |
| 2012/0174043 | A1 | * | 7/2012 | Queru .......................... | 715/863 |
| 2013/0120279 | A1 | * | 5/2013 | Plichta et al. .................. | 345/173 |
| 2013/0174100 | A1 | * | 7/2013 | Seymour et al. .............. | 715/863 |
| 2013/0222275 | A1 | * | 8/2013 | Byrd et al. .................... | 345/173 |
| 2014/0071171 | A1 | * | 3/2014 | McGowan et al. ........... | 345/661 |
| 2014/0157209 | A1 | * | 6/2014 | Dalal et al. .................... | 715/863 |
| 2014/0298266 | A1 | * | 10/2014 | Lapp ............................. | 715/835 |

FOREIGN PATENT DOCUMENTS

WO   WO2012129670 A1   10/2012

* cited by examiner

*Primary Examiner* — Kimnhung Nguyen
(74) *Attorney, Agent, or Firm* — Seed IP Law Group PLLC

(57) ABSTRACT

A touch controller is coupled to a touch screen and detects a first gesture at a first point on the touch screen. The first gesture includes physical contact of the touch screen by a user device at the first point. The touch controller detects a second gesture that is associated with movement of the user device from the first point to a second point on the touch screen. The second gesture includes detecting movement of the user device within a sensing range from the first point to the second point. The sensing range corresponds to an orthogonal distance from a surface of the touch screen. The touch controller detects a third gesture at the second touch point. The third gesture includes physical contact of the touch screen at the second touch point. Upon detecting the first, second and third gestures the touch controller performs a corresponding action.

19 Claims, 7 Drawing Sheets

THREE-DIMENSIONAL GESTURE RECOGNITION SYSTEM, CIRCUIT, AND METHOD FOR A TOUCH SCREEN

TECHNICAL FIELD

The present disclosure relates generally to touch screens and relates more specifically to three-dimensional gesture recognition for touch screens.

BACKGROUND

Touch panels or touch screens are present in many different types of common modern electronic devices, such as cellular telephones, tablet computers, portable music and video devices, personal digital assistants, portable gaming devices, and so on. In these electronic devices the touch screen is part of the user interface of the device. The touch screen typically includes a display, touch sensors, and a touch controller. The touch sensors are typically some sort of transparent sensor array, such as an ultrasonic, resistive, vibration, or capacitive sensor array, that is attached to or formed as an integral part of the display. When a user touches the sensor array either with a finger or a stylus, the sensor array generates corresponding electronic sensor signals that are provided to the touch controller. From these sensor signals, the touch controller detects the occurrence of a touch or touch point.

The touch controller also determines the type of "touch event" to be associated with the touch point, along with various characteristics of the touch event, and provides this information to processing circuitry in the electronic device. The processing circuitry operates in response to this information to allow a user to control the electronic device through these touches or touch points on the touch screen. The touch controller captures frame data from the touch sensors and processes this frame data to detect the presence of a touch point and the type of touch event (i.e., touch-in event, touch-out event, touch-motion event) associated with the touch point. This processing is typically referred to as touch frame processing and through this processing the touch controller generates touch information including the type of touch event and the location of the touch event on the touch screen. Touch frame processing also includes detecting or recognizing particular gestures by a user on the touch screen and controlling the electronic device accordingly. For example, the ubiquitous "swipe gesture" is commonly used to flip from one page to another in a document or to change to different sections on a desktop or home screen of an electronic device.

A typical capacitive touch sensor is formed by an array of conductive force lines $C_i$ and sense lines $L_j$ that are arranged orthogonal to one another to form a matrix or array of touch or sensor nodes $C_iL_j$. The force lines $C_i$ may be viewed as column lines and the sense lines $L_j$ as row lines, where the array includes "i" force lines and "j" sense lines. Patterns other than mere orthogonally arranged conductive lines are typically utilized, such as diamond-shaped patterns, as will be appreciated by those skilled in the art. The sensor nodes collectively detect the touch information, which includes location information, the touch event type (i.e., touch-in event, touch-out event, or touch-motion event), and other parameters like pressure, size, and so on, as will be appreciated by those skilled in the art.

The sensor nodes $C_iL_j$ detect the touch information through variations of four "fringing" capacitances associated with each sensor node $C_i,L_j$ when a user touches the sensor proximate the sensor node. This is typically referred to as "mutual sensing" since the touch by the user affects the capacitance between adjacent nodes or the "mutual capacitance" between the nodes. In addition, current capacitive touch screens also utilize self-capacitance (i.e., the current at each sensor node to ground), which is affected by the presence of a user's finger or other suitable device positioned within a sensing range from the surface of the touch screen but not touching the touch screen. In this way, the position of the user's finger above the touch screen can be detected. With such touch screens three-dimensional sensing is possible since both touches on the touch screen (i.e., two-dimensional touches) and the position of a user's finger above the touch screen (i.e., a third dimensional touch) can be sensed and utilized in controlling the electronic device containing the touch screen. Accordingly, three-dimensional gestures may be detected and utilized in controlling the electronic device.

There is a need for improved three-dimensional gesture recognition systems and methods for touch screens.

SUMMARY

According to one embodiment, a touch controller is coupled to a touch screen and is operable to detect a first gesture at a first point on the touch screen. The first gesture includes physical contact of the touch screen by a user device at the first point. After the first gesture, the touch controller detects a second gesture that is associated with movement of the user device from the first point to a second point on the touch screen. The second gesture includes detecting movement of the user device within a sensing range from the first point to the second point. The sensing range corresponds to an orthogonal distance from a surface of the touch screen. Finally, upon the user device reaching the second touch point within the sensing range, the touch controller is operable to detect a third gesture at the second touch point. The third gesture includes physical contact by the user device of the touch screen at the second touch point. Upon detecting the first, second and third gestures the touch controller performs a corresponding action. The action may be moving one or more icons displayed on the touch screen proximate the first touch point to points on the touch screen proximate the second touch point. The action may also be moving an icon positioned at the first touch point to the second touch point in a path defined by the movement of the user device detected as part of the second gesture.

DETAILED DESCRIPTION

Figure 1:
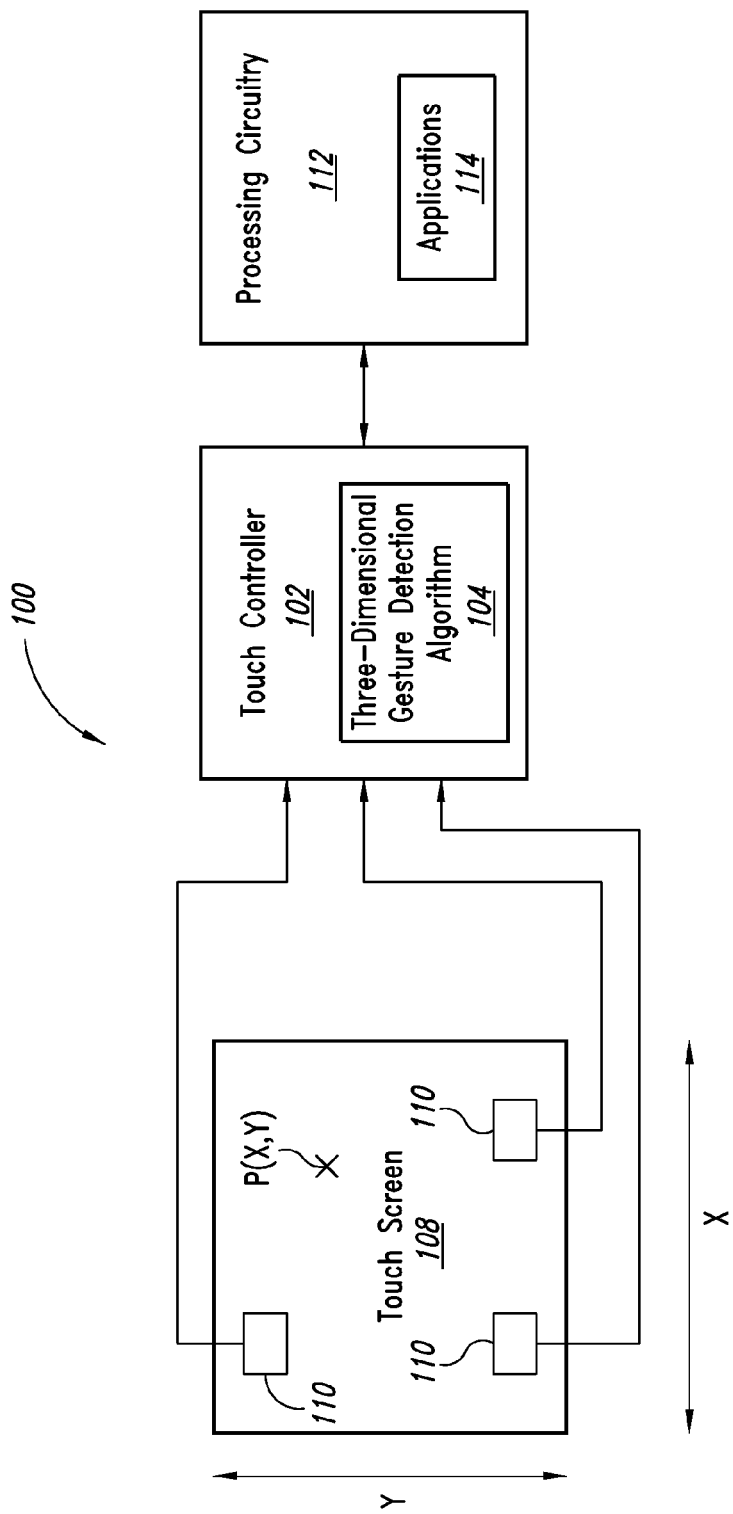
FIG. 1 is a functional block diagram of an electronic device including a touch controller operable to execute a three-dimensional gesture detection algorithm according to one embodiment.

FIG. 1 is a functional block diagram of an electronic device 100 including a touch controller 102 that executes a three-dimensional gesture detection algorithm 104 according to one embodiment described in the present disclosure. In operation, the touch controller 102 executes the three-dimensional gesture detection algorithm 104 to detect the presence of a desired three-dimensional gesture on a touch screen 106 that is coupled to the controller. The three-dimensional gesture includes the detection of touch points P(X,Y) on a surface 108 of the touch screen 106 or within a sensing range SR (not shown in FIG. 1) above the surface. The three-dimensional gesture detection algorithm 104 enables three-dimensional gestures analogous to three dimensional actions a user would use in everyday life, such as picking up an object at one location and placing it down at another location, to be utilized by a user and detected by the touch screen controller 102 executing the algorithm, as will be explained in more detail below.

In the following description, certain details are set forth in conjunction with the described embodiments to provide a sufficient understanding of the invention. One skilled in the art will appreciate, however, that the invention may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the present invention.

The touch screen 106 has a number of touch sensors 110 positioned on the touch screen 106 to detect touch points P(X,Y) on and within the sensing range SR above the touch screen, with only three touch sensors being shown merely to simplify the figure. The touch controller 102 controls the touch screen 106 to detect a user's finger, stylus, or any other suitable device, all of which will collectively be referred to as a "user device" herein, that is actually touching the touch screen 106 or is within the sensing range SR above the touch screen. The detection of the user device at a particular location on the touch screen 106 is defined as a touch point P(X,Y) on the touch screen. An X-axis and Y-axis are shown in FIG. 1, with the X coordinate of a touch point P(X,Y) corresponding to a point along the X-axis and the Y coordinate to a point along the Y-axis. Note that each touch point P(X,Y) can also be viewed as having a Z coordinate (i.e., touch point P(X,Y,Z)) that corresponds to a point along a Z-axis (not shown) that is orthogonal to the surface 108 of the touch screen 106. When the point along the Z-axis is zero the user device is in contact with or "on" the surface of the touch screen 106 and when the point on the Z-axis is non-zero the user device is above the surface but within the sensing range SR, as will be discussed in more detail below with reference to FIGS. 4A-4E.

In one embodiment the three-dimensional gesture detection algorithm does not determine a specific value for the point on the Z-axis where each user device is located, but only the X and Y coordinates of the user device, meaning the touch point P(X,Y). Thus, as long as the user device is either touching the surface 108 of the touch screen 106 or within the sensing range SR above this surface, the touch controller will determine the corresponding touch point P(X,Y) of the user device. In other embodiments, the touch controller 102 controls the touch screen 106 to determine a specific value for the point along the Z-axis for each touch point P(X,Y) to effectively determine touch points P(X,Y,Z), and this value along the Z-axis is used in the three-dimensional gesture detection algorithm 104.

The touch sensors 110 generate corresponding sensor signals responsive to a touch point P(X,Y) and provide these signals to the touch controller 102 for processing. The touch sensors 110 are typically contained in some sort of transparent sensor array that is part of the touch screen 106, the detailed structure of which is understood by those skilled in the art and thus will not be described herein. The number and location of the touch sensors 110 can vary as can the particular type of sensor, such as ultrasonic, resistive, vibration, or capacitive sensors. Embodiments will now be described where the touch sensors 110 are capacitive touch sensors capable of detection of touch points present within the sensing range SR, but the concepts disclosed with reference to these embodiments may be applied to other types of touch sensors as well where these other types of touch sensors can be controlled to sense touch points both on the surface 108 of the touch screen 106 and within the sensing range SR above the touch screen 106.

The electronic device 100 further includes processing circuitry 112 coupled to the touch controller 102 and operable to execute applications or "apps" 114 designed to perform a specific function or provide a specific service on the electronic device 100. Where the electronic device 100 is a cellular phone or a tablet computer, for example, the applications 114 can include a wide variety of different types of applications, such as music applications, email applications, video applications, game applications, weather applications, reader applications, and so on. The touch controller 102 reports touch information to the applications 114, which operate in response thereto to control operation of the application and/or the electronic device. The processing circuitry 112 may be any suitable processing circuitry, such as a microprocessor where the electronic device 100 is a personal computer or an applications processor where the electronic device is a smart phone or tablet computer. Similarly, the touch controller 102 may include any suitable digital and/or analog circuitry to perform the desired functions of the controller, and three-dimensional gesture detection algorithm 104 likewise may be implemented as a software module or as a combination of software and hardware circuitry in the controller.

Figures 2A, 2B:
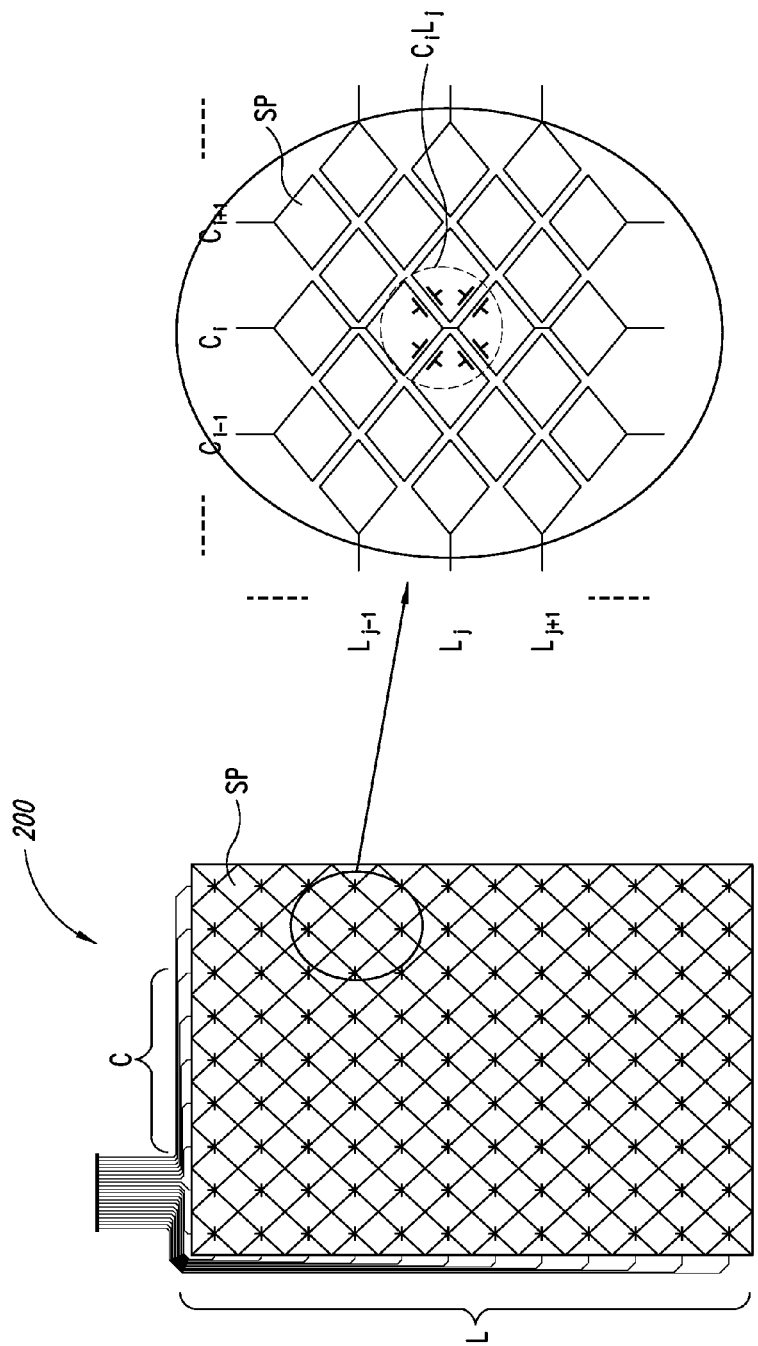
FIG. 2A is more detailed diagram of one type of capacitive touch sensor that may be part of the touch screen of FIG. 1.
FIG. 2B is an exploded portion of the capacitive touch sensor of FIG. 2A illustrating fringing capacitances at a sensor node of the touch sensor.

FIG. 2A is more detailed diagram of one type of capacitive touch sensor array 200 that may be part of the touch screen 106 of FIG. 1. The capacitive touch sensor array 200 corresponds to the touch sensors 110 of FIG. 1. In the structure of FIG. 2A, the capacitive touch sensor array 200 includes a plurality of sense lines Lj and a plurality of orthogonally arranged force lines Ci. Each sense line Lj and force line Ci is a conductive line having a plurality of diamond-shaped conductive sense pads SP arranged along a length of the sense or force line, as seen in the array 200. For a given sense line Lj or force line Ci, the conductive sense pads SP of that line are all electrically connected to one another to form the line. This is more easily seen in the exploded view of FIG. 2B showing a portion of the capacitive touch sensor array 200 of FIG. 2A.

Three force lines Ci−1, Ci, and Ci+1 and three sense lines Lj−1, Lj, and Lj+1 are shown in the exploded view of FIG. 2B. In FIG. 2B, the diamond-shaped conductive sense pads SP of the force lines C are shown interconnected to one another. While no such interconnection is shown for the conductive sense pads SP of the sense lines L, this has been done merely to simplify and clarify FIG. 2B, but it should be pointed out that the diamond-shaped conductive sense pads SP of the sense lines S are also connected to one another even though not shown in the figure. The intersections of the force lines C and sense lines L define touch sensor nodes CiLj, as expressly shown for one such sensor node in the center of FIG. 2B. FIG. 2B also shows the four fringing capacitances C that are affected by the occurrence of a touch point P(X,Y) on a sensor node CiLj.

As seen in the figure, the fringing capacitances C are capacitances between adjacent sense pads SP in a force line C and the proximate sense pads of an adjacent sense line L. In the example of FIG. 2B, the fringing capacitances C are formed between the sense pads SP in the force line Ci and the adjacent sense pads of the sense line Lj. The values of these fringing capacitances C (i.e., mutual capacitances) vary as a function of whether a touch point P(X,Y) is present on the surface 108 of the touch screen 106 (FIG. 1), and these changes are detected by the touch controller 102 to detect touch points P(X,Y). The touch controller 102 also detects the self-capacitance at each sensor node CiLj and uses this to detect whether a user device, although not touching the surface 108 of the touch screen 106, is present above the sensor node within the sensing range SR of the touch screen.

Figure 3:
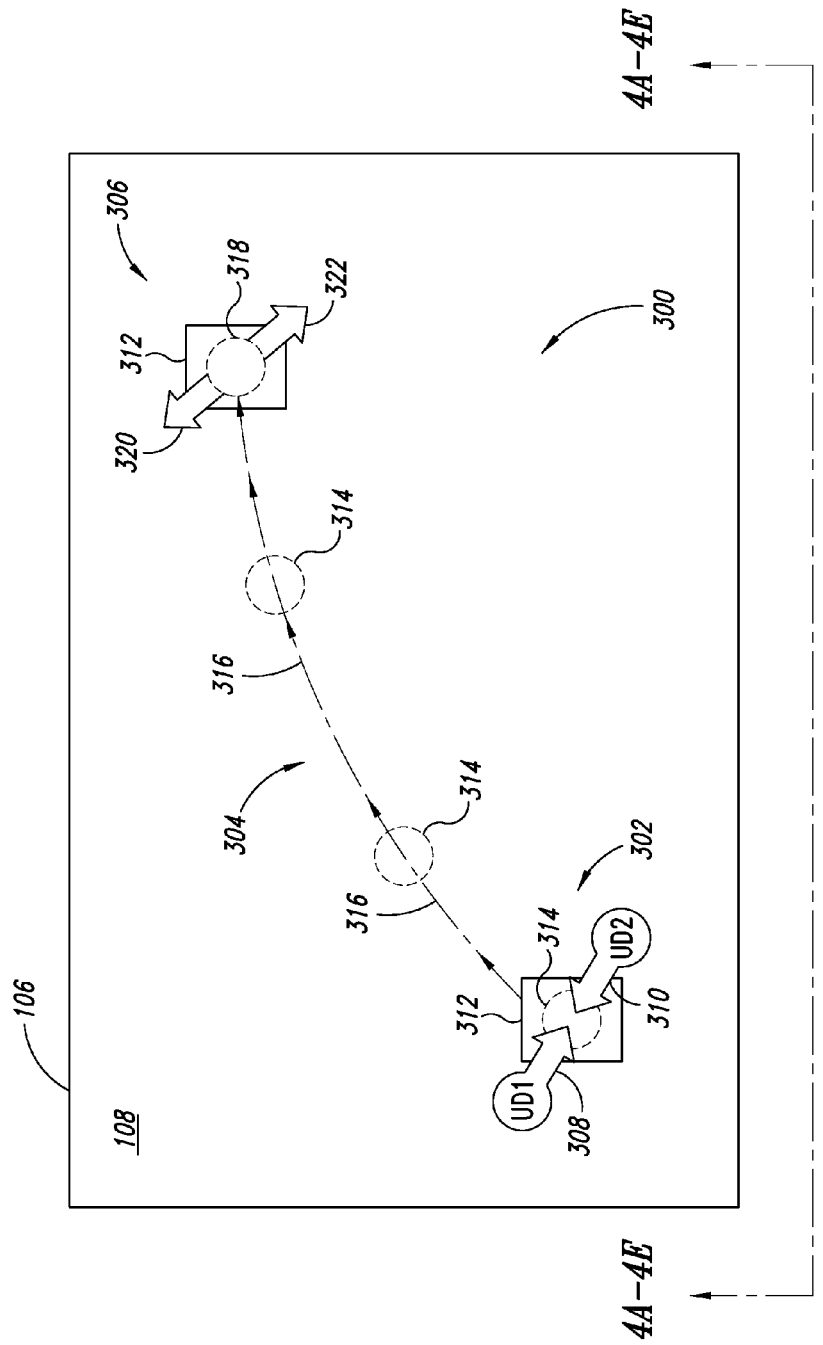
FIG. 3 is a top view of a touch screen showing a three-dimensional gesture that is detected by the touch controller of FIG. 1 according to one embodiment.

FIG. 3 is a top view of the touch screen 106 showing a three-dimensional gesture 300 that is detected by the three-dimensional gesture detection algorithm 104 executing on the touch controller 102 of FIG. 1 according to one embodiment described in the present disclosure. In the following description, the detection of the three-dimensional gesture 300 will be described as being performed by the three-dimensional gesture detection algorithm 104 to simplify the description, although those skilled in the art will realize that it is the touch controller 102, through the execution of this algorithm, which detects the three-dimensional gesture 300.

The three-dimensional gesture 300 includes three individual gestures that collectively form the three-dimensional gesture. More specifically, the three-dimensional gesture 300 includes a pinch gesture 302 that is followed by a drag gesture 304 and terminates with a drop gesture 306 as will now be explained in more detail. For the pinch gesture 302, a user (not shown in FIG. 3) places a first user device UD1 and a second future device UD2 in contact with the surface 108 of the touch screen 106, with the two user devices being spaced apart from one another as seen in the figure. The two user devices UD1 and UD2 would typically be the user's index finger and thumb. As seen in FIG. 3, the pinch gesture 302 includes a user placing the two user devices UD1, UD2 on the surface 108 of the touch screen 106 spaced apart from one another and thereafter sliding the two user devices towards each other or "pinching" the two user devices. This pinching is represented by arrows 308 and 310 in the figure.

The two user devices UD1 and UD2 are placed on the surface 108 proximate an icon 312 that is being displayed on the touch screen 106 and that is to be moved through the three-dimensional gesture 300. The two user devices UD1 and UD2 are thereafter moved together as indicated by arrows 308 and 310 until they contact each other, which is represented in the figure through the dashed circle 314 over the icon 312. Again, where the two user devices UD1 and UD2 are the index finger and thumb of the user, the dashed circle 314 represents the index finger and thumb pressed together against one another at the end of the pinch gesture 302. This will primarily be referred to as either the pressed together user devices 314 or pressed together fingers 314 in the following description.

In response to the pinch gesture 302, the three-dimensional gesture detection algorithm 104 (FIG. 1) selects the icon 312 that is to be moved. This "selection" would typically be displayed on the touch screen 106 in some way to provide feedback to the user that the desired icon 312 has indeed been selected. The way in which the selection of the icon 312 is illustrated for the user may of course vary, such as by making the icon semi-transparent, shifting the location of the icon slightly so that the user may more easily see the selected icon given that his or her pinched fingers are over the icon, and so on, as will be appreciated by those skilled in the art. Note that in the present description the details as to how the three-dimensional gesture detection algorithm 104 detects the pinch gesture 302 are not described because a variety of different ways to make this detection are possible and may vary depending on the specific touch screen 106 that is being utilized, and such details for controlling the touch controller 102 to make this detection are understood by those skilled in the art.

After the three-dimensional gesture detection algorithm 104 detects the pinch gesture 302, the next gesture that is detected by the three-dimensional gesture detection algorithm 104 is the drag gesture 304. The three-dimensional gesture detection algorithm 104 detects the start of the drag gesture 304 when the user lifts the pressed together user devices 314 (i.e., the user's index finger and thumb in the embodiment being described) off of the surface 108 of the touch screen 106. As discussed above, the touch screen 106 can detect the presence of the pressed together user devices 314 off the surface 108 as long as these devices are within the sensing range SR of the touch screen, as will be described in more detail with reference to FIGS. 4A-4E.

Once the algorithm 104 detects the start of the drag gesture 304, the algorithm thereafter continues to detect the specific position of the pressed together user devices 314 over the surface 108 of the touch screen 106. The position of the pressed together user devices 314 defines a path 316 over which the pressed together user devices are moved. The endpoint of this path 316 corresponds to the location on the touch screen 106 where the user wishes to move the icon 312, which is in the upper right-hand corner of the touch screen 106 in the example of FIG. 3. Accordingly, the user performs the pinch gesture 302, lifts his or her pressed together fingers 314 off the surface 108 but within the sensing range SR, and then moves the pressed together fingers from the lower left-hand corner of the touch screen 106 to the upper right-hand corner of the touch screen along the path 316. FIG. 3 shows the pressed together fingers 314 at several points between the start of the path 316 in the lower left-hand corner of the figure and the end of the path in the upper right-hand corner of the figure.

Once the user has moved the pressed together fingers 314 to the end of the path 316 in the upper right-hand corner of the touch screen 106, the user thereafter moves the pressed together fingers down and touches the touch screen at this point. In FIG. 3, the pressed together fingers in contact with the touch screen 106 at the end of the path 316 are designated 318 and represented by the dashed circle. At this point, the user then performs the drop gesture 306 and moves the pressed together fingers 318 outward as illustrated by arrows 320 and 322. In response to the three-dimensional gesture detection algorithm 104 detecting the drop gesture 306, the icon 312 is moved to the upper right-hand corner of the touch screen 106 as illustrated in FIG. 3. In this way, the three-dimensional gesture detection algorithm 104 allows a natural three-dimensional gesture 300 including the pinch gesture 302, drag gesture 304, and drop gesture 306 to be utilized for moving the icon 312 from one point on the touch screen 106 two another point on the touch screen. The three-dimensional gesture 300 is analogous to the real-life movement of picking an object up at a first point moving it to a second point and dropping it at that second point.

Figure 4A:
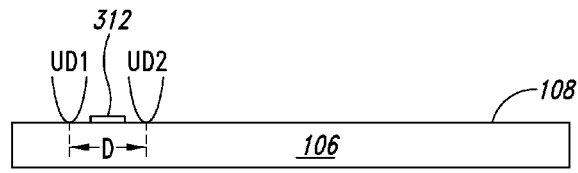
FIGS. 4A-4E are side views of the three-dimensional gesture of FIG. 3 better illustrating the third dimension of the gesture that is orthogonal to the surface of the touch screen of FIG. 3.
Figure 4B:
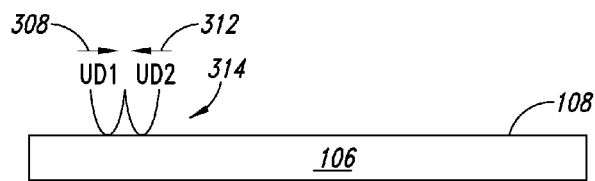

FIGS. 4A-4E are side views of the three-dimensional gesture 300 of FIG. 3 better illustrating the third dimension of the gesture, namely the sensing range SR, which is orthogonal to the surface 108 of the touch screen 106 of FIG. 3. FIG. 4A illustrates the first and second user devices UD1 and UD2 at the beginning or start of the pinch gesture 302. The icon 312 is represented in FIG. 4A in the form of a rectangle on the surface 108 of the touch screen 106 between the first and second user devices UD1 and UD2. As mentioned above, the first and second user devices UD1 and UD2 contact the surface 108 of the touch screen 106 at a distance D that is sufficient to contain at least a portion of the icon 312 between the first and second user devices, as illustrated. FIG. 4B illustrates the second portion of the pinch gesture 302 in which the first and second user devices UD1 and UD2 are pinched together as illustrated by the arrows 308 and 310. Thus, the figure illustrates the pressed together user devices or fingers 314 previously described with reference to FIG. 3.

Figure 4C:
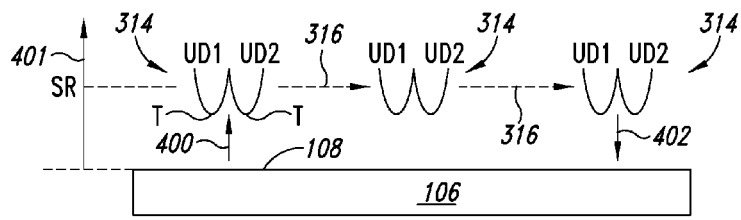

FIG. 4C illustrates the start of the drag gesture 304 on the far left of the figure. An arrow 400 illustrates the upward movement of the pressed together fingers 314 relative to FIG. 4B that starts the drag gesture 304. As seen in FIG. 4C, tips T of the user devices UD1 and UD2 (i.e., fingers) are no longer in contact with the surface 108 of the touch screen 106 but are within the sensing range SR of the touch screen. The sensing range SR is a distance along an axis 401 orthogonal to the surface 108 of the touch screen 106, as illustrated on the far left of FIG. 4C. The pressed together fingers 314 are thereafter moved from left to right along the path 316 as illustrated in FIG. 4C, with the tips T of the user devices UD1 and UD2 remaining within the sensing range SR for the entire length of the path 312. If the tips T of the devices UD1, UD2 were to go beyond the sensing range SR then the device could no longer be reliably detected by the touch screen 106. Although the precise orthogonal distance of the tips T along the axis 401 orthogonal to the surface 108 may vary over the length of the patch 316, the tips T must remain within the sensing range SR. Other embodiments are possible, however, where if the tips T of the pressed together fingers 314 go beyond the sensing range SR but return back inside the sensing range within a certain period of time, then the algorithm 104 (FIG. 1) would pick up tracking of the pressed together fingers again when they are once again detected within the sensing range. At the end of the path 316 on the far right of FIG. 4C the pressed together fingers 314 are positioned in the upper right-hand corner of the touch screen 106 of FIG. 3 and accordingly are in position over the touch screen where the icon 312 is to be moved. At this point, the pressed together fingers 314 are moved downward as indicated by the arrow 402 to contact the surface 108 of the touch screen 106 and thereby end the drag gesture 304 and start the drop gesture 306.

Figure 4D:
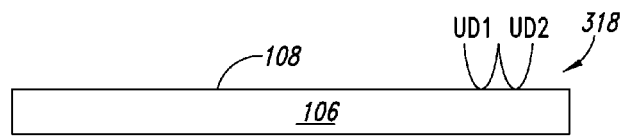
Figure 4E:
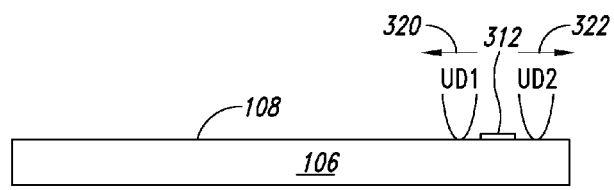

FIG. 4D illustrates the pressed together fingers in contact with the surface 108 of the touch screen 106 at the end of the path 316 where the icon 312 is to be moved and thus corresponds to the pressed together fingers 318 previously described with reference to FIG. 3. This is the start of the drop gesture. The pressed together fingers 314 are thus designated 318 after they contact the surface 108 to start the drop gesture 306. At this point, as seen in FIG. 4E the pressed together fingers 318 are moved apart as illustrated by arrows 320 and 322. When the three-dimensional gesture detection algorithm 104 (FIG. 1) detects the completion of the drop gesture 306 as illustrated in FIG. 4E, the algorithm moves or places the icon 312 at this new location. The icon 312 at the new location is represented as a rectangle on the surface 108 positioned between the moved apart fingers or user devices UD1 and UD2 illustrated in FIG. 4E.

Figure 5:
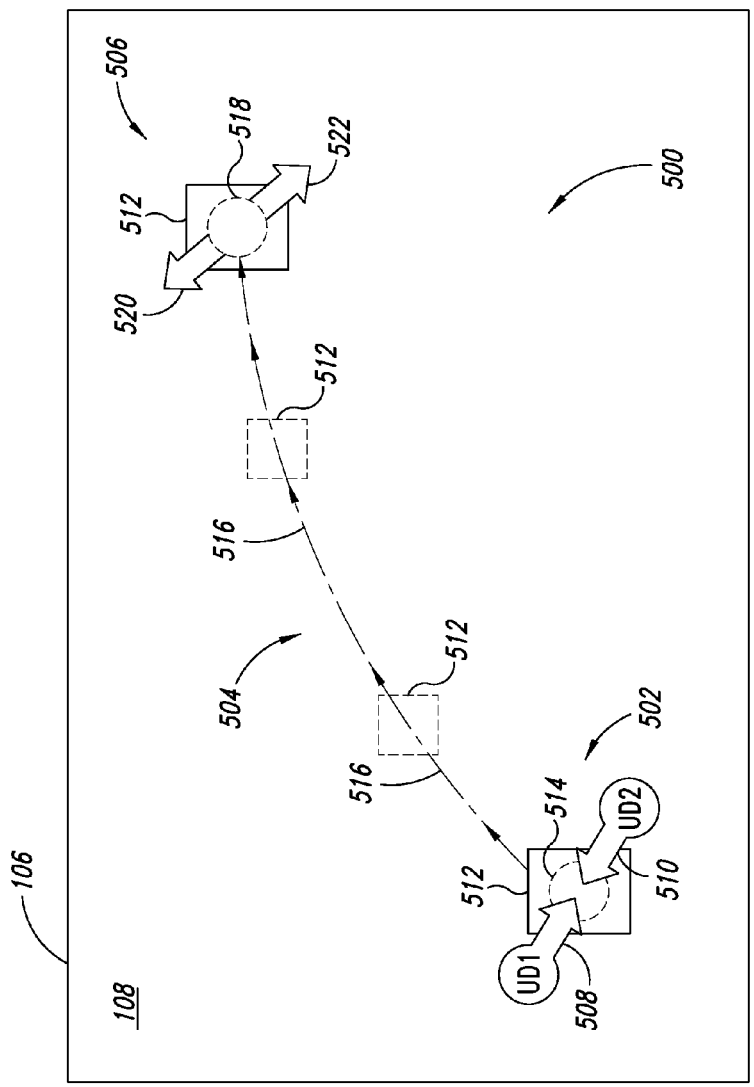
FIG. 5 is a top view of the three-dimensional gesture detected by the touch controller of FIG. 1 according to another embodiment described in the present disclosure.

FIG. 5 is a top view of the touch screen 106 illustrating a three-dimensional gesture 500 detected by the touch controller 102 of FIG. 1 according to another embodiment described in the present disclosure. The embodiment of FIG. 5 is similar to the embodiment of FIG. 3 and accordingly elements illustrating the three-dimensional gesture 500 have been given the same "5XX" designation as the corresponding element "3XX" of FIG. 3 where the letters "XX" represent the specific two digits for that element. The three-dimensional gesture 500 is the same as a three-dimensional gesture 300 except that with the three-dimensional gesture 500 the icon 512 that is being moved by the user moves along the past 516 during the drag gesture 504 portion of the three-dimensional gesture. This is represented through dashed lines for the icon 512 four points along the path 516 between the start of the path in the lower left-hand corner of the touch screen 108 and the end of the path in the upper right-hand corner of the touchscreen. Thus, in the three-dimensional gesture 500 icon 512 moves along the path 516 as the user moves his or her pressed-together fingers 512 along the path. The display of the icon 512 could change to indicate selection of the icon during the pinch gesture 502 portion of the three-dimensional gesture 500 as described for the pinch gesture 302 of FIG. 3, with the selected icon being the icon that moves along the path 516 as the user moves his or her pressed together fingers 514 along the path. Most users would typically prefer this type of visual feedback as provided by the three-dimensional gesture 500 so that they know definitively that they are moving the desired icon 512.

Figure 6:
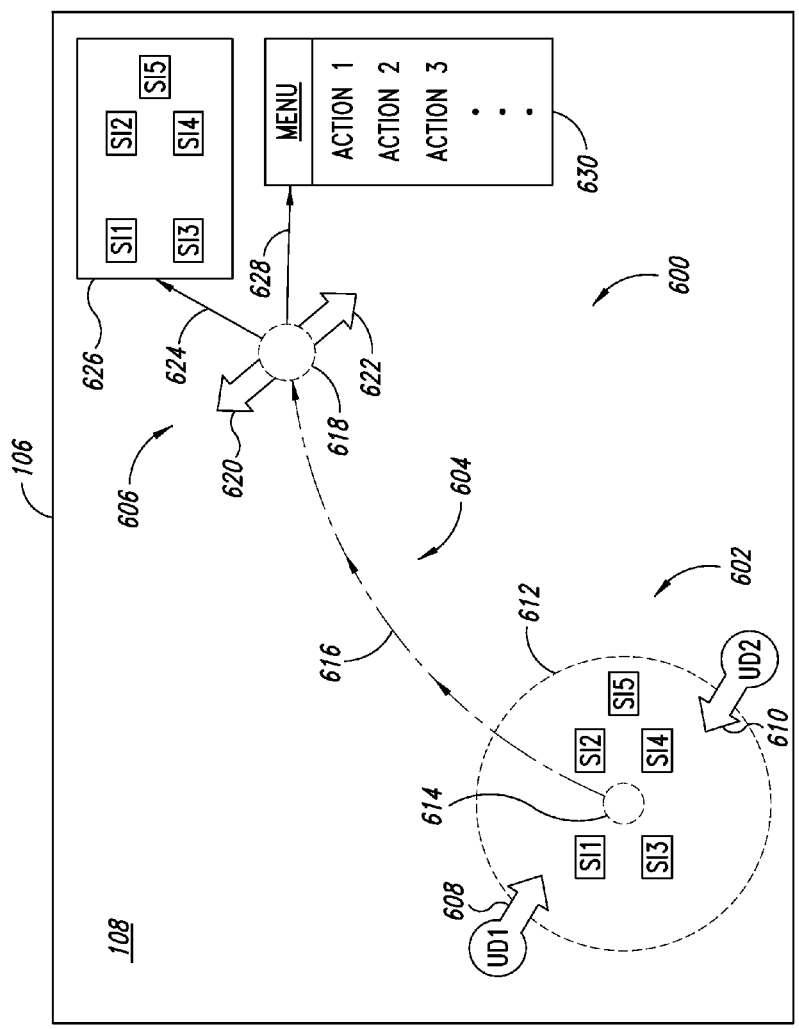
FIG. 6 is a top view illustrating a three-dimensional gesture detected by the touch controller of FIG. 1 according to a further embodiment described in the present disclosure.

FIG. 6 is a top view of the touch screen 106 illustrating a three-dimensional gesture 600 detected by the touch controller 102 of FIG. 1 according to a further embodiment described in the present disclosure. Once again, the three-dimensional gesture 600 is similar to the gestures 300 and 500 previously described with reference to FIGS. 3 and 5, respectively. Accordingly, just as discussed above with regard to FIG. 5, the elements illustrating the three-dimensional gesture 600 have been given the same "6XX" designation as the corresponding elements "3XX" and "5XX" of FIGS. 3 and 5 where the letters "XX" represent the specific two digits for that element.

In the three-dimensional gesture 600 pinch gesture 602 and drop gesture 606 differ from those corresponding gestures described with reference to the embodiments of FIGS. 3 and 5. With the three-dimensional gesture 600 the pinch gesture 602 includes the selection of a number of screen icons SI1-SI5 contained within an area on the touchscreen 108 defined by the placement of the user devices UD1 and UD2. Five screen icons SI1-SI5 are illustrated merely by way of example and the number of screen icons may of course vary. The screen icons SI1-SI5 are collectively designated 612 in FIG. 6. In the same way as previously described with reference to FIG. 4A for the single icon 312, for the pinch gesture 602 the first and second user devices UD1 and UD2 contact the surface 108 of the touch screen 106 at a distance D that is sufficient to contain at least a portion of the all of the screen icons SI1-SI5 to be selected and moved. The dashed circle labeled 612 in FIG. 6 collectively represents all of the screen icons SI1-SI5 selected and being moved, and the diameter (not shown) of this dashed circle corresponds to the distance D discussed with reference to FIG. 4A.

In the embodiment of FIG. 6 the user devices UD 1 and UD 2 are initially placed on the surface 108 in positions such that the desired one or more screen icons SI to be moved are contained within these positions. Once the user devices UD 1 and UD 2 are placed on the surface 108 in these positions, the pinch gesture 602 is the same as described for the pinch gesture 302 of FIG. 3. The same is true for the drag gesture 604, where the group of screen icons SI selected and being moved may not be displayed along the path 616 as in the embodiment of FIG. 3 or may be displayed along the path as in the embodiment of FIG. 5. The specific way in which the selected icons 612 is displayed along the path 616 may vary in different embodiments.

As previously described with reference to FIG. 3, throughout the drag gesture 604 as the user moves the pressed together user devices 614 along the path 616 the user devices are within the sensing range SR above the surface 108 of the touch screen 106. At the end of the path 616 the user places the pressed together user devices 614 in contact with the surface at the desired location to which the selected icons 612 are to be moved, which is designated as the pressed together user devices 618 and FIG. 6. The user then moves the pressed together user devices 618 outward as indicated by the arrows 620 and 622 in the same way as described for the drop gestures 306 and 506 in the embodiments of FIGS. 3 and 5.

In response to the user moving the pressed together user devices 618 outward as indicated by arrows 620 and 622, the completion of the drop gesture 606 includes one of three different actions corresponding to three different embodiments of the three-dimensional gesture 600. In a first embodiment, the selected screen icons 612 are merely moved to be positioned around the point of the pressed together user devices 618 in the same arrangement as for the icons initially around the pressed together user devices 614 at the start of the path 616.

In another embodiment, indicated by arrow 624 in FIG. 6, in response to the user moving the pressed together user devices 618 outward a window 626 is displayed on the touch screen 106. Contained within the displayed window 626 are all the screen icons SI1-SI5 that were selected in the pinch gesture 602. At this point, the user can identify which ones of the selected icons SI1-SI5 the user desires to move to the new location on the touch screen 106. This can be done in a variety of different ways, as will be appreciated by those skilled in the art. For example, in one embodiment individually touches each of the screen icons SI1-SI5 displayed within the window 626 to thereby choose which ones of these icons are to be moved and thereafter performs a gesture that indicates the desired icons have been chosen, at which point the chosen icons are moved to the new location on the touch screen 106. The gesture that indicates the desired icons SI1-SI5 have been chosen can likewise vary. For example, a "done" could be displayed within the window 626 for the user to touch after choosing the desired icons SI1-SI5 to be moved. Alternatively, a gesture such as a swipe across the window 626 could be performed to indicate the desired icons SI1-SI5 have been chosen, at which point these icons would be repositioned on the touch screen 106.

In yet another embodiment, indicated by arrow 628 in FIG. 6, in response to the user moving the pressed together user devices 618 outward a window 630 is displayed on the touch screen 106. Contained within the displayed window 630 is a menu of actions (ACTION 1, ACTION 2, and so on illustrated in FIG. 6) that can be performed on the selected screen icons 612. One action could be, for example, moving the selected icons 612 to the new location on the touch screen 106. Another action could be copying the selected icons 612 to the new location on the touch screen 106. Yet another action could be choosing which ones of the selected icon 612 are to be moved or copied to the new location on the touch screen 106.

Figure 7:
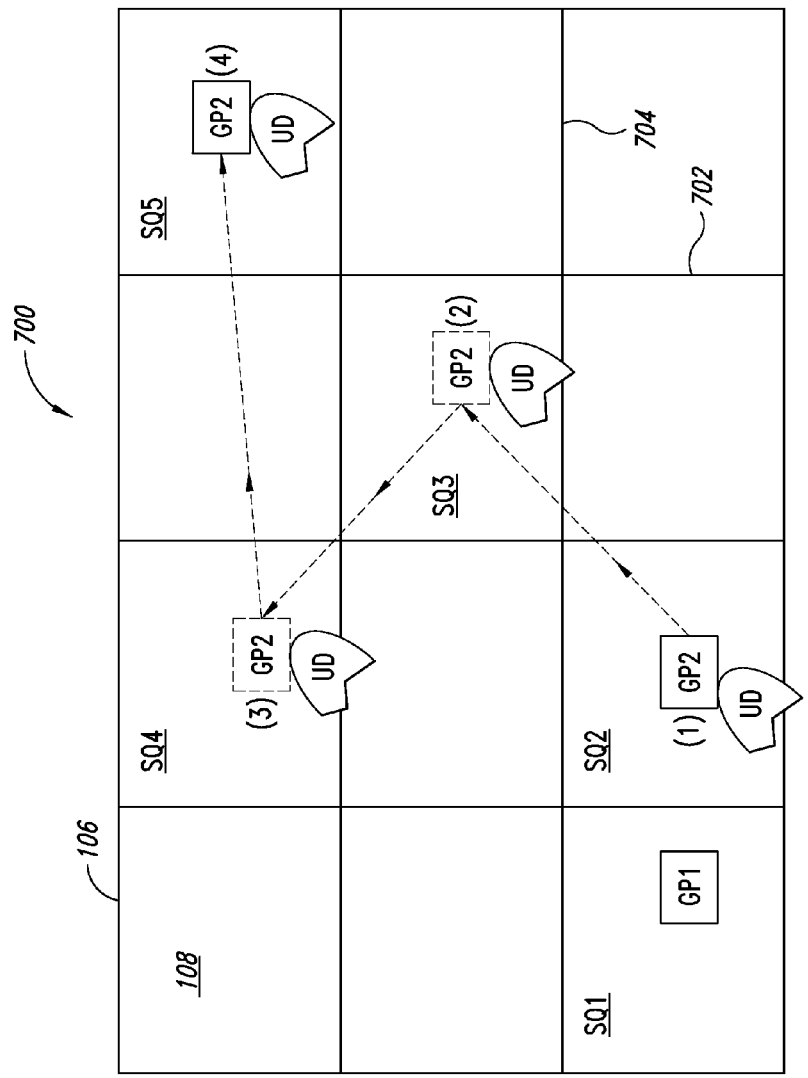
FIG. 7 is a top view of a touchscreen illustrating a three-dimensional gesture detected by the touch controller of FIG. 1 for use in a gaming application according to a still further embodiment described in the present disclosure.

FIG. 7 is a top view of the touchscreen 106 illustrating a three-dimensional gesture 700 detected by the touch controller 102 of FIG. 1 for use in a gaming application according to a still further embodiment described in the present disclosure. In the embodiment of FIG. 7 the gaming application, which would be one of the apps 114 running on the processing circuitry 112 of FIG. 1, displays a game board on the touch screen 106. In the example of FIG. 7 the game board corresponds to a grid of squares defined by intersecting orthogonal lines 702 and 704, such as for a board game like chess or checkers.

In the example of FIG. 7, two game pieces GP 1 and GP 2 are shown in respective squares SQ1 and SQ2 in the lower left-hand corner of the game board. A user device UD, which would typically be the user's finger, initially selects the game piece GP 2 in square SQ2, as represented by the step (1) illustrated in figure. The selection of the game piece GP 2 could correspond to the player merely touching the game piece with the user device UD or performing a "long" touch of the game piece. Other gestures, such as the pinch gesture 502 of FIG. 5 can also be utilized to select a game piece GP2. The player thereafter lifts the user device UD off of the surface 108 of the touch screen 106 and decides where to move the selected game piece GP 2. In the example of FIG. 7 the player initially moves the selected game piece GP 2 to the square SQ3 as illustrated by the step (2) in the figure. This corresponds to the drag gesture 504 described with reference to FIG. 5 and may be described as a "hover" feature of the drag gesture in that the player can hover the user device UD over any particular square on the game board but the game piece GP2 will not be placed on the square until the player contacts the surface 108 of the touch screen 106 at the desired square.

Continuing with the example of FIG. 7, the player decides not to place the selected game piece GP 2 in the square SQ3 and thus does not contact the surface 108 of the touch screen 106 at this square. The game piece GP2 is illustrated with dashed lines at square SQ3 for this reason. The next decides to move the piece GP2 to the square SQ4, which is illustrated as step (3) in the figure. Once again, the player decides not to place the game piece GP2 on the square SQ4 so the game piece is illustrated with a dashed line at this square. Finally, the player decides to move the selected game piece GP2 to the square SQ5 in the upper right-hand corner of the game board, which is illustrated as step (4). The player decides to place the selected game piece GP2 on the square SQ5, and thus the player would again touch the surface 108 of the touch screen 106 to position the game piece GP2 on the square SQ5. As mentioned above, other gestures like the drop gestures 306 and 506 described above with reference to FIGS. 3 and 5 could be utilized to place the game piece GP2 on the desired square.

One skilled in the art will understood that even though various embodiments and advantages have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate, may be realized through software executing on suitable processing circuitry. Therefore, the present invention is to be limited only by the appended claims.

What is claimed is:

1. A touch controller adapted to be coupled to a touch screen, the touch controller operable to,
   detect a first gesture at a first point on the touch screen where the first gesture includes physical contact of the touch screen by a user device at the first point;
   after detection of the first gesture, the touch controller operable to detect a second gesture that is associated with movement of the user device from the first point to a second point on the touch screen while the user device is not touching a surface of the touch screen but is within a sensing range corresponding to an orthogonal distance from the surface of the touch screen;
   upon the user device reaching the second touch point within the sensing range, the touch controller operable to detect a third gesture at the second touch point,
      wherein the third gesture includes physical contact by the user device of the touch screen at the second touch point; and
   upon detecting the first, second and third gestures the touch controller being operable to perform a corresponding action.

2. The touch controller of claim 1, wherein the user device comprises two or more fingers of a user.

3. The touch controller of claim 2, wherein the first gesture comprises a pinch gesture.

4. The touch controller of claim 3, wherein the third gesture comprises a drop gesture.

5. The touch controller of claim 4, wherein an end point of the pinch gesture is maintained throughout the second gesture.

6. The touch controller of claim 1, wherein the action comprises moving a single icon positioned at the first point to the second point.

7. The touch controller of claim 6,
   wherein the first point corresponds to a first location on a game board that displayed on a display associated with the touch screen,
   wherein the second point corresponds to a second location on the game board, and
   wherein the single icon is a game piece that is moved from the first location to the second location.

8. The touch controller of claim 7, wherein the single icon is chess piece and the displayed game board is a chess board.

9. The touch controller of claim 1,
   wherein the second gesture includes a path defined by the movement of the user device between first point and the second point, and
   wherein the single icon moves along the path as the user device moves along the path.

10. The touch controller of claim 1, wherein the action comprises moving a plurality of icons displayed on the touch screen proximate the first touch point to points on the touch screen that are proximate the second touch point.

11. The touch controller of claim 1, wherein the action further comprises, upon detection of the third gesture, displaying a menu on touch screen to enable a user to select which of the plurality of icons should be moved to the second point.

12. The electronic device of claim 1, wherein the touch screen comprises a capacitive touch screen.

13. An electronic device, comprising:
   processing circuitry;
   a touch screen; and
   a touch controller coupled to the processing circuitry and the touch screen, the touch controller operable to execute a three-dimensional detection algorithm to,
   detect a first gesture at a first point on the touch screen where the first gesture includes physical contact of the touch screen by a user device at the first point;
   after detection of the first gesture, the touch controller operable to detect a second gesture that is associated with movement of the user device from the first point to a second point on the touch screen while the user device is not touching a surface of the touch screen but is within a sensing range corresponding to an orthogonal distance from the surface of the touch screen;
   upon the user device reaching the second touch point within the sensing range, the touch controller operable to detect a third gesture at the second touch point,
      wherein the third gesture includes physical contact by the user device of the touch screen at the second touch point; and
   upon detecting the first, second and third gestures the touch controller being operable to perform a corresponding action.

14. The electronic device of claim 13, wherein the processing circuitry comprises cellular telephone processing circuitry.

15. The electronic device of claim 13, wherein the touch screen comprises a capacitive touch screen.

16. The electronic device of claim 13, wherein the three-dimensional detection algorithm comprises a software module executing on suitable digital circuitry in the touch controller.

17. The touch controller of claim 13, wherein the user device is a pair of user fingers.

18. The touch controller of claim 17,
   wherein the first gesture comprises a pinch gesture,
   wherein the second gesture comprises a drag gesture, and
   wherein the third gesture comprises a drop gesture.

19. The touch controller of claim 18, wherein an end point of the pinch gesture in the form of pressed together fingers is maintained throughout the drag gesture.

* * * * *